Patented May 29, 1951

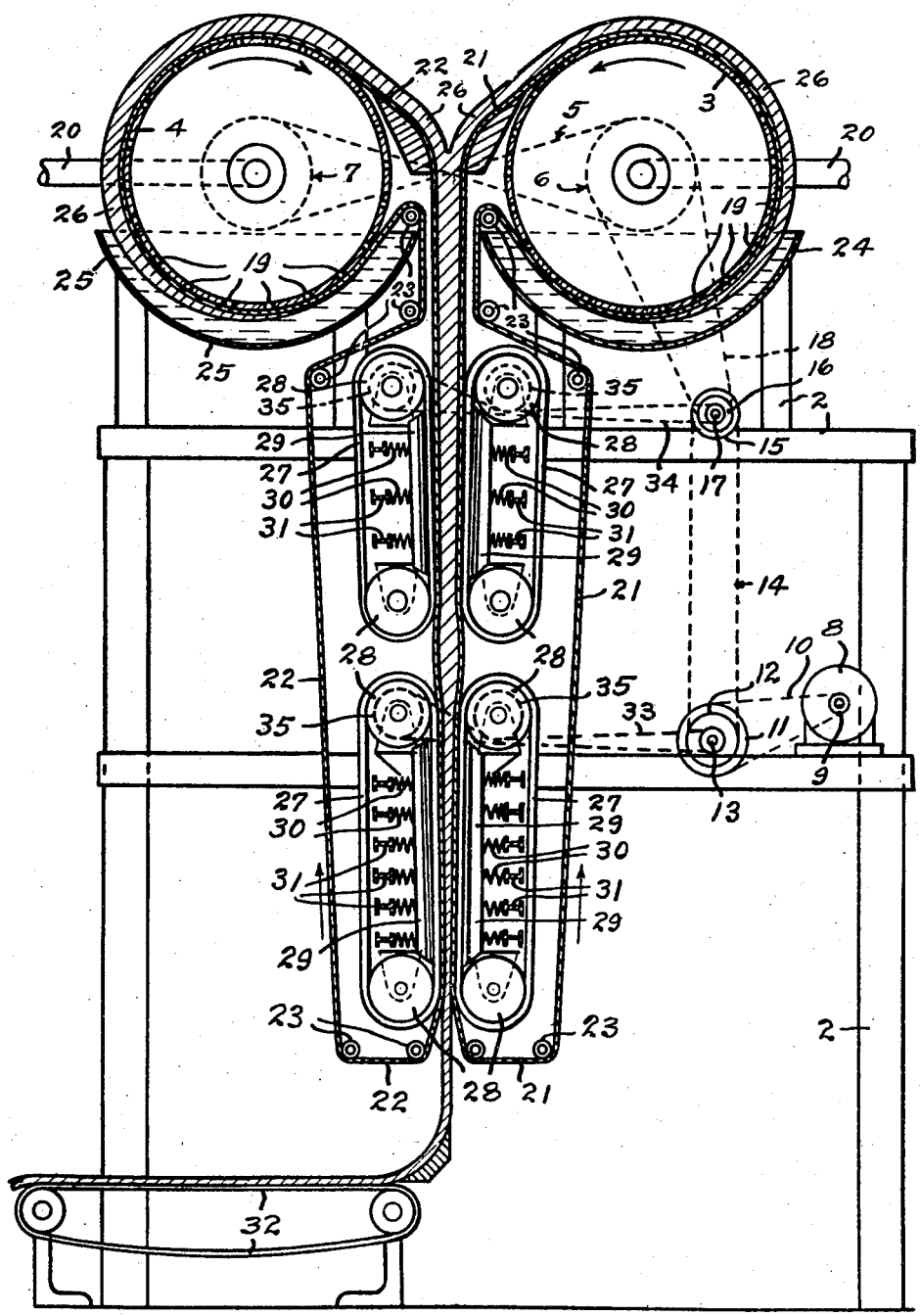

2,554,968

UNITED STATES PATENT OFFICE 2,554,968

CONTINUOUS PRESSURE SEPARATING DEVICE OPERATING IN MULTIPLE STAGES

Robert M. Thompson, Seattle, Wash.

Original application March 29, 1939, Serial No. 264,809, now Patent No. 2,382,453, dated August 14, 1945. Divided and this application August 6, 1945, Serial No. 609,196

3 Claims. (Cl. 100—35)

My invention relates to the art of devices designed to separate fluids or liquids from other fluids or liquids of greater fluidity and fluids or liquids from solids.

This application is a divisional application of my copending application Serial No. 264,809 and bearing Patent No. 2,382,453, under date of August 14, 1945.

More particularly, my invention relates to a combined press and filter press or to a press designed for continuous operation which is characterized by the development of extremely high pressures and practical and efficient operation. Particularly does my invention relate to simplifying and reducing the cost of the filtration or filtration step in the industrial arts, which step at present constitutes one of the expensive operations in manufacturing.

It is common practice in the art of filtration to refer to devices designed for the separation of materials by the application of force or pressure to the materials from without, as "presses"; while devices designed for the separation of materials by having the force or pressure transmitted through the materials themselves as "filter presses." "Filter presses" are usually used where the amount of solids to be separated is but a small proportion of the total mobile mass composed of said solids and liquids in which said solids are disposed and hence the said materials are pumped into the filter press. "Presses" on the other hand, are used where the proportion of solid matter is much greater in relation to that of the liquid composing said materials to be filtered. This invention relates to both "presses" and "filter presses."

An object is to provide a continuous pressure separating device having continuously moving slat belts and having a feed hopper positioned above the slat belts and having filter belts which move with the slat belts and which travel down through the hopper over perforated walls and help to promote the feeding through the machine of some materials which contain a large percentage of liquid, said hopper being provided with vacuum means for drawing off a large percentage of liquid before the material passes into the press, thereby facilitating the feeding of material through the press and being further provided with means for varying the degree of the vacuum action exerted.

Another object is to provide a continuous pressure separating device which is provided with vacuum means for picking up solid material on the filter belts and withdrawing a portion of the liquid before said filter belts with their adhering material pass into the pressure area of the machine.

Since for some uses the price for a large size machine designed to exert high pressures is prohibitive and unnecessary for removing a large percentage of the liquid, an object of the present invention is to provide a continuous pressure separating device comprised of a plurality of separating devices, through all of which the same filter belts pass, the final separating device being of relatively small size but of heavy construction designed to exert high pressures, while the preceding separating devices are of relatively light and economical construction.

It is an object of this invention to provide means to exert a suction through a moving filter belt so that solid material is picked up on a moving filter belt and then said material is subjected to pressure in one or more spaced apart continuously operating press units to express the liquid from the solid material.

Other objects of this invention are more completely set forth and in detail in the said parent application of which this is a divisional application.

The above mentioned general objects of my invention together with others inherent in the same are attained by the mechanism illustrated in the following drawing, the same being a preferred exemplary form of embodiment of my invention, in which drawing like reference numerals indicate like parts:

The figure is a somewhat diagrammatic view partly in vertical section of a combined press and filter press illustrating this invention.

In the drawing there is disclosed a frame 2 supporting two spaced apart rotatively mounted perforated drums or rolls 3 and 4. The rolls 3 and 4 are positioned on the upper portion of the frame 2. The rolls 3 and 4 have a driving connection between them whereby they are driven in opposite directions as indicated by the arrows. This driving connection is somewhat diagrammatically indicated by broken lines which show a crossed belt or link belt 5 operable on pulleys or sprocket wheels 6 and 7. The diagrammatically shown driving means for drums 3 and 4 also embodies a motor 8 acting through pulley 9, belt 10, wheels or pulleys 11 and 12 on countershaft 13, belt 14, wheels or pulleys 15 and 16 on countershaft 17, belt 18 and a wheel or pulley, not shown, which coincides with wheel 6. Obviously this drive may be made up of belts and pulleys or link belts and sprocket wheels. The drums 3 and 4 have perforations 19 in their peripheral walls. A vacuum pipe 20 is connected with the interior of each drum 3 and 4 whereby a suction may be exerted through the perforations 19.

Two endless filter belts 21 and 22 pass around the respective drums 3 and 4 and also pass through one or more press units positioned below the drums 3 and 4. Suitable guide rollers 23 are provided where needed for these filter belts to run on. Two pans 24 and 25 respectively are positioned underneath the drums 3 and 4 so that the lower peripheral portions of the drums are within the pans. Material to be filtered, usually in the form of liquid containing solid matter which is to be separated therefrom, is introduced into the pans. The filter belts are supported in contact with the portions of the drums which dip into the pans and the suction exerted through the belts will cause layers 26 of solid matter to collect on these belts as they move through the pans. These layers of solid matter will be brought together at the location where the belts begin to move downwardly and the solid matter will be between the belts when the belts pass through the press or presses.

The press or presses are shown somewhat diagrammatically in Fig. 1. Each press comprises two opposed slat belts 27 movable on wheel or guide means 28 and supported by frame or track means 29. The track means 29 are resiliently supported by springs 30 which rest against cross bars 31. More springs 30 are shown in the lower press member than in the upper one as the lower press is of heavier construction and is designed to provide a much higher pressure than the upper one.

The material will first pass through the upper press and for many materials will have a large percentage of the liquid expressed therefrom at a low pressure. The cake will expand somewhat between the two presses as indicated in the drawing and will then pass through the lower press where a much higher pressure will be applied and where more liquid will be expressed, and the cake, in the desired condition of dryness, may be discharged over a horizontal conveyor 32. Relieving the pressure on the cake and permitting some expansion thereof is advantageous in the handling of some materials. Also it will be understood that only one press or more than two presses may be used in series with the rolls 3 and 4 if desired. The press or filter press construction through which the cake 26 is moved may also be of any of the forms shown in the parent application of which this is a divisional, or of any of the other Letters Patents issued to me which comprise:

No. 1,778,342, October 14, 1930, Filter Device.
No. 1,997,611, April 16, 1935, Combined Press and Filter Device.
No. 2,202,239, May 28, 1940, Plug Top Closing Member for Filter Presses.
No. Re. 21,723, February 18, 1941, Continuous Pressure Separating Device.
No. 2,263,343, November 18, 1941, Slat Belt for Presses and Filter Presses.

The invention of the present application is primarily characterized by the employment of perforate rolls 3 and 4 and the means associated therewith to form the cake or layers 26 of substantially solid material which are fed to a filter press.

Driving means for the slat belts 27 is indicated diagrammatically by broken lines in the drawing. The driving means therein indicated comprises belts or link belts 33 and 34 driven from the countershafts 13 and 17 and engaging with driving wheels 35 on shafts which carry the guide wheel means 28 over which the slat belts 27 pass.

An advantage of the construction shown in Figure 1 lies in the fact that it makes possible a lighter press construction and saves in cost of construction. The first press in the series may be of light construction. This reduces the cake to a pre-determined thickness in a light inexpensive press and only the final press need be of expensive construction to withstand heavy pressures. Also because the cake is already formed and partly compressed before it enters the heavy pressure press the problems of feeding this press are simplified.

Low density materials present a problem in providing efficient means for separating the liquids from the solids. In continuously separating liquids from solids it will be understood that the density of the material in the first place may be very low, and the large excess of free liquid may be best removed by exerting initially a light pressure. As some of the liquid is removed there is gradually developed in the material being operated upon between the two belts a material of increasing density so that an increasing pressure is required in order to separate the material under conditions of maximum efficiency.

The capacity of the machine will thus be greatly improved by providing a predetermined rate of change of pressure and this will be individual or characteristic of the particular material being treated, no two materials being exactly the same.

For failure to take into consideration these inherent features or characteristics of material there has been, in the devices and methods heretofore provided for separating liquids and solids, great inefficiency, and realization of only a portion of the maximum possible capacity of the device. All of which has resulted in increasing cost of treatment.

Obviously, changes may be made in the forms, dimensions, and arrangement of the parts of my invention, without departing from the principle thereof, the above setting forth only a preferred form of embodiment.

I claim:

1. A continuous pressure separating device comprising a rotatable drum having a perforated cylindrical wall; a receptacle for liquids and solids which are to be separated, said receptacle embracing a portion of said drum; a press comprising a gradually converging pressure chamber defined between oppositely disposed moving and gradually converging wall means; one of said moving wall means comprising a moving filter belt extending around said drum and through said receptacle and through said press and moving in a direction from said drum toward said press; and vacuum means connected with said drum whereby a suction is exerted through said filter belt to withdraw liquid through said filter belt and accumulate on said filter belt a layer of material to be passed through and pressed in the gradually converging chamber of said press.

2. A continuous pressure separating device comprising a rotatable drum having a perforated cylindrical wall; a receptacle for liquids and solids which are to be separated, said receptacle embracing a portion of said drum; a plurality of press units of succeedingly increasing strength; a moving filter belt extending around said drum and through said receptacle and through all of said press units and moving in a direction from said drum toward said press units; and vacuum means connected with said drum whereby a suction is exerted through said filter belt to withdraw liquid through said filter belt and accumulate on said filter belt a layer of material to be passed through successive press units of succeedingly increasing strength.

3. A continuous pressure separating device comprising two receptacles adapted to receive liquids and solids that are to be separated; two rotatable drums positioned partly within the respective receptacles and each having a perforated cylindrical wall; a continuously operating press; two filter belts, each extending around one of said drums and through one of said receptacles and both extending through said press and movable in directions from said drums toward said press; and vacuum means connected with each of said drums whereby suction will be exerted through said filter belts to withdraw liquid through said filter belts and accumulate on each filter belt a layer of material, which two layers are brought together by the belts and passed through said press between said filter belts.

ROBERT M. THOMPSON.

REFERENCES CITED

The following references are of record in the file of this patent:

UNITED STATES PATENTS

| Number | Name | Date |
|---|---|---|
| 457,217 | Rohrer | Aug. 4, 1891 |
| 1,646,653 | Mauss | Oct. 25, 1927 |
| 1,730,590 | Rice | Oct. 8, 1929 |
| 2,029,081 | Mottweiler | Jan. 28, 1936 |
| 2,112,869 | Thompson | Apr. 5, 1938 |
| 2,229,582 | Merrill | Jan. 21, 1941 |